United States Patent
Tamachi et al.

(10) Patent No.: US 8,264,818 B2
(45) Date of Patent: Sep. 11, 2012

(54) ELECTROCHEMICAL CELL AND METHOD OF MANUFACTURING ELECTROCHEMICAL CELL

(75) Inventors: Tsuneaki Tamachi, Chiba (JP); Hiroaki Uetake, Chiba (JP); Shunji Watanabe, Chiba (JP)

(73) Assignee: Seiko Instruments Inc., Mihama-Ku, Chiba-Shi, Chiba (JP)

( * ) Notice: Subject to any disclaimer, the term of this patent is extended or adjusted under 35 U.S.C. 154(b) by 383 days.

(21) Appl. No.: 12/690,421

(22) Filed: Jan. 20, 2010

(65) Prior Publication Data

US 2010/0183915 A1    Jul. 22, 2010

(30) Foreign Application Priority Data

Jan. 21, 2009   (JP) .................................. 2009-011075
Dec. 3, 2009    (JP) .................................. 2009-275620

(51) Int. Cl.
*H01G 9/00* (2006.01)
(52) U.S. Cl. ............................. 361/502; 361/503
(58) Field of Classification Search ................ 361/502
See application file for complete search history.

(56) References Cited

U.S. PATENT DOCUMENTS

| | | | | |
|---|---|---|---|---|
| 5,453,909 A * | 9/1995 | Kobayashi | ..................... | 361/502 |
| 7,031,140 B2 * | 4/2006 | Omura et al. | ................. | 361/517 |
| 7,054,138 B2 * | 5/2006 | Tatezono et al. | ............. | 361/502 |
| 7,079,376 B2 * | 7/2006 | Tatezono et al. | ............. | 361/502 |
| 7,248,460 B2 * | 7/2007 | Omura et al. | ................. | 361/502 |
| 7,304,832 B2 * | 12/2007 | Ushio et al. | ................... | 361/502 |
| 7,321,486 B2 * | 1/2008 | Nemoto et al. | ............... | 361/305 |
| 2006/0187614 A1 * | 8/2006 | Ushio et al. | ................... | 361/502 |
| 2007/0228507 A1 * | 10/2007 | Endo et al. | .................... | 257/499 |
| 2007/0253141 A1 * | 11/2007 | Kato et al. | ................. | 361/301.3 |
| 2007/0274024 A1 * | 11/2007 | Nemoto et al. | ............... | 361/502 |
| 2008/0206631 A1 * | 8/2008 | Christensen et al. | ......... | 429/149 |

FOREIGN PATENT DOCUMENTS

JP    2000-294454 A    10/2000
JP    2001-216952 A    8/2001

* cited by examiner

*Primary Examiner* — Eric Thomas
(74) *Attorney, Agent, or Firm* — Brinks Hofer Gilson & Lione; Tadashi Horie (57) ABSTRACT

Provided is an electric double layer capacitor capable of simply connecting a current collector to an external electrode at a low cost and ensuring a sealing property of a container. The electric double layer capacitor includes: a container in which an opening of a concave portion is sealed; an electrolytic solution and a pair of electrode active materials which are accommodated inside the container; and a pair of conductive films which is respectively and electrically connected to the pair of electrode active materials and is formed from a bottom surface of the concave portion to a surface of the container through an opening edge.

10 Claims, 8 Drawing Sheets

ELECTROCHEMICAL CELL AND METHOD OF MANUFACTURING ELECTROCHEMICAL CELL

This application claims priority under 35 U.S.C. §119 to Japanese Patent Application Nos. JP2009-011075 filed on Jan. 21, 2009 and JP2009-275620 filed on Dec. 3, 2009, the entire content of which is hereby incorporated by reference.

BACKGROUND OF THE INVENTION

1. Technical Field

The present invention relates to an electrochemical cell and a method of manufacturing an electrochemical cell.

2. Related Art

In the past, an electrochemical cell such as an electric double layer capacitor or a nonaqueous electrolyte battery was used as a backup power source of a clock function, a backup power source of a memory or a semiconductor, a standby power source of an electronic device such as an IC memory or a microcomputer, a power source of a solar clock or a driving motor, and the like. In recent years, the electrochemical cell has been examined as a power source of an electric automobile, an auxiliary electric storage unit of an energy conversion/storage system, or the like.

Particularly, since a surface-mountable electric double layer capacitor can be decreased in size or height, the electric double layer capacitor is suitable for a slim portable device. The electric double layer capacitor includes a container in which an opening of a concave portion is sealed and an external electrode which is formed on an outer surface of the container. The container accommodates an electrode active material used as a positive electrode and a negative electrode, a current collector connected to the electrode active material, and an electrolytic solution. In addition, the external electrode and the current collector inside the container are electrically connected to each other.

As the container of the electric double layer capacitor, a resinous container has been examined. However, in general, since a resin has a low gas barrier property and high moisture permeability compared with metal, moisture enters into an electrode portion, and the electrolytic solution and the moisture react with each other at the time of the application of the voltage, which may cause deterioration such as a decrease in storage amount of the capacitor. In addition, in the case where a lead frame is adopted together with the resinous container so as to connect the current collector inside the container to the external electrode, since the adhesiveness between the resin and the lead frame is poor, a leakage of a liquid may occur.

In addition, as the container of the electric double layer capacitor, a ceramics container has been examined. In the ceramics container, in the case where the current collector inside the container is connected to the external electrode by using a metal layer (refer to JP-A-2001-216952), since it is necessary to use a metal layer capable of enduring a sintering temperature of the ceramics, the manufacturing cost increases. In addition, in the ceramics container or the glass container, in the case where the current collector inside the container is connected to the external electrode by using a via (for example, refer to JP-A-2000-294454), it is necessary to use a high-cost material and to perform a complex process such as plating on the via or polishing on the embedded electrode. Further, a leakage of a liquid may occur through the via.

SUMMARY OF THE INVENTION

The present invention is contrived in consideration of the above-described problems, and an object of the invention is to provide an electrochemical cell and a method of manufacturing an electrochemical cell capable of simply connecting a current collector to an external electrode at a low cost and ensuring a sealing property of a container.

In order to solve the above-described problems, according to an aspect of the invention, there is provided an electrochemical cell including: a container in which an opening of a concave portion is sealed; an electrolytic solution and a pair of electrode active materials which are accommodated inside the container, the electrochemical cell further including a pair of conductive films which is respectively and electrically connected to the pair of electrode active materials and is formed from a bottom surface of the concave portion to a surface of the container through an opening edge.

With such a configuration, the conductive film formed on the bottom surface of the concave portion functions as a current collector, and the conductive film formed on the opening edge of the concave portion functions as an external electrode. For this reason, since the conductive film is formed from the bottom surface of the concave portion to the opening edge, it is possible to simultaneously form the current collector, the external electrode, and a connection wiring therebetween. Accordingly, it is possible to simply connect the current collector to the external electrode. At this time, since a lead frame, a via, or the like is not used, it is possible to ensure the sealing property of the container.

In addition, since the conductive film is formed from the bottom surface of the concave portion to the opening edge, it is possible to simply form the conductive film in such a manner that a film formation process is performed from the opening by masking a predetermined region of the container. In addition, since the conductive film is formed on the surface of the container, it is possible to form the conductive film after forming the container. For this reason, since it is not necessary to form the conductive film by using a material capable of enduring a sintering temperature of the container, it is possible to decrease the manufacturing cost. Accordingly, it is possible to simply connect the current collector to the external electrode at a low cost.

The pair or electrode active materials may be disposed in parallel in a bottom surface of the concave portion.

With such a configuration, unlike the related art in which the pair of electrode active materials is laminated in the normal direction of the bottom surface of the concave portion, it is possible to allow the pair of electrode active materials and the pair of conductive films to have a symmetrical structure. Accordingly, it is possible to provide the electrochemical cell which can be used without distinguishing the positive electrode from the negative electrode. In addition, in the case where the electrolytic solution drips from the opening of the concave portion, it is possible to equally perfuse the electrolytic solution to the pair of electrode active materials, and to equally discharge bubbles from the pair of electrode active materials. Accordingly, since it is possible to impregnate the same amount of electrolytic solution into the pair of electrode active materials, it is possible to prevent a difference in electric characteristics caused by a difference in impregnation amount.

The pair of conductive films may be formed from valve metal.

With such a configuration, since a corrosion-resistant passive coating is formed on the surface of the valve metal, it is possible to prevent the corrosion of the conductive film due to the electrolytic solution.

The pair of conductive films may be continuously formed to a side surface of the container.

With such a configuration, it is possible to increase a variation of a mounting structure of the electrochemical cell with respect to the circuit board.

The container may be formed by laminating and heat-sealing a plurality of resin sheets.

With such a configuration, it is possible to form the container at a low cost.

Meanwhile, according to another aspect of the invention, there is provided a method of manufacturing an electrochemical cell including a container in which an opening of a concave portion is sealed, an electrolytic solution and a pair of electrode active materials which are accommodated inside the container, and a pair of conductive films which is respectively and electrically connected to the pair of electrode active materials and is formed from a bottom surface of the concave portion to a surface of the container through an opening edge, the method including: simultaneously forming the pair of conductive films.

With such a configuration, since the pair of conductive films is simultaneously formed, it is possible to simply connect the current collector to the external electrode at a low cost.

The pair of conductive films may be formed by physical vapor deposition.

With such a configuration, since it is possible to improve the adhesiveness of the conductive film with respect to the surface of the container, it is possible to ensure the sealing property of the container.

The pair of conductive films may be formed by plating.

With such a configuration, the conductive film formed on the opening edge of the concave portion can be directly used as the external electrode.

According to the electrochemical cell of the invention, since the conductive film is formed from the bottom surface of the concave portion to the opening edge, it is possible to simply connect the current collector to the external electrode at a low cost. At this time, since a lead frame, a via, or the like is not used, it is possible to ensure the sealing property of the container.

DETAILED DESCRIPTION OF THE PREFERRED EMBODIMENTS

An electrochemical cell according to exemplary embodiments of the invention will be described with reference to the accompanying drawings. In addition, in the following embodiments, an electric double layer capacitor is exemplified, but the electrochemical cell according to the invention may be applied to a nonaqueous electrolyte battery.

First Embodiment

Figure 1:
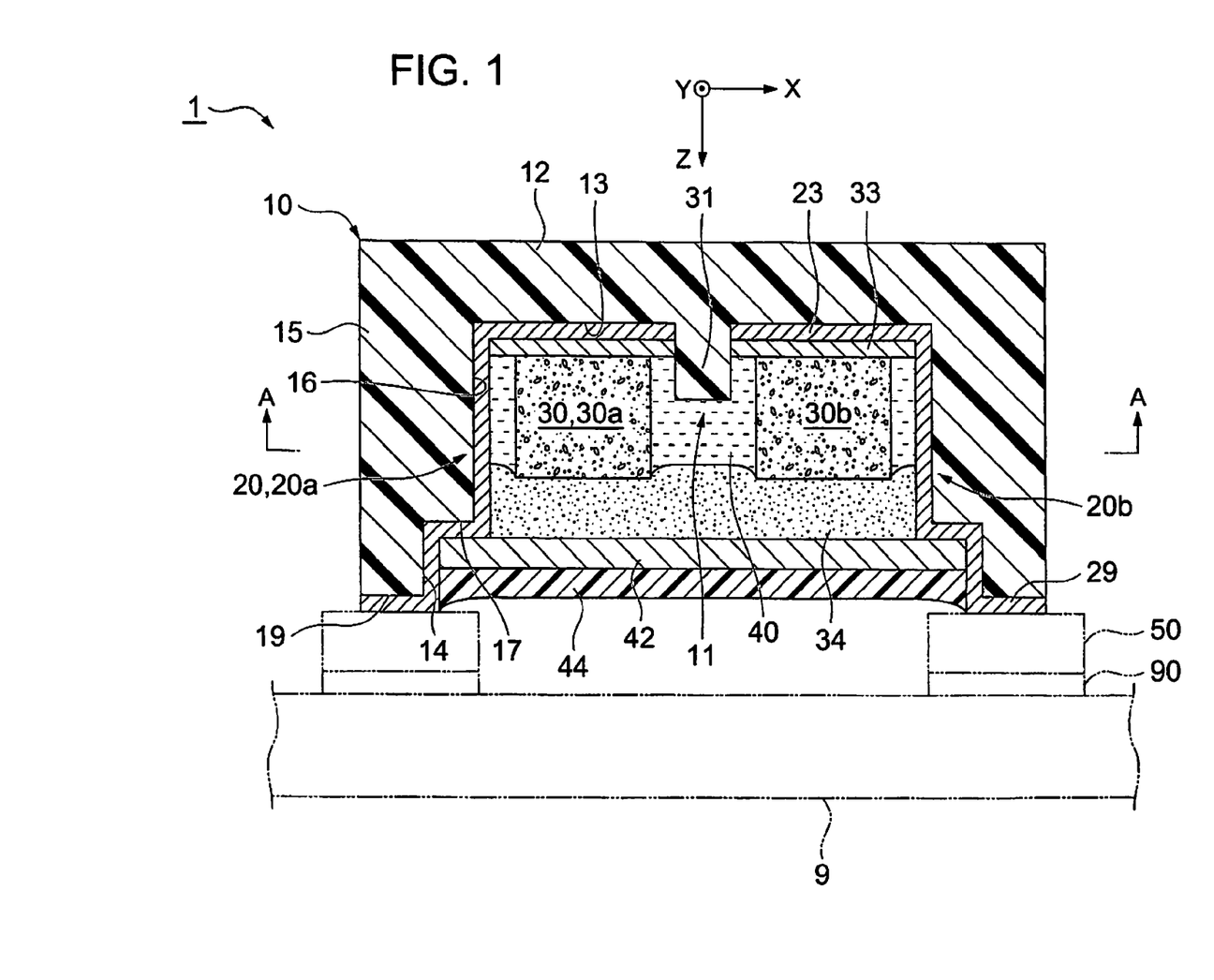
FIG. 1 shows an electric double layer capacitor according to a first embodiment and is a side sectional view taken along the line B-B of FIG. 2.
Figure 2:
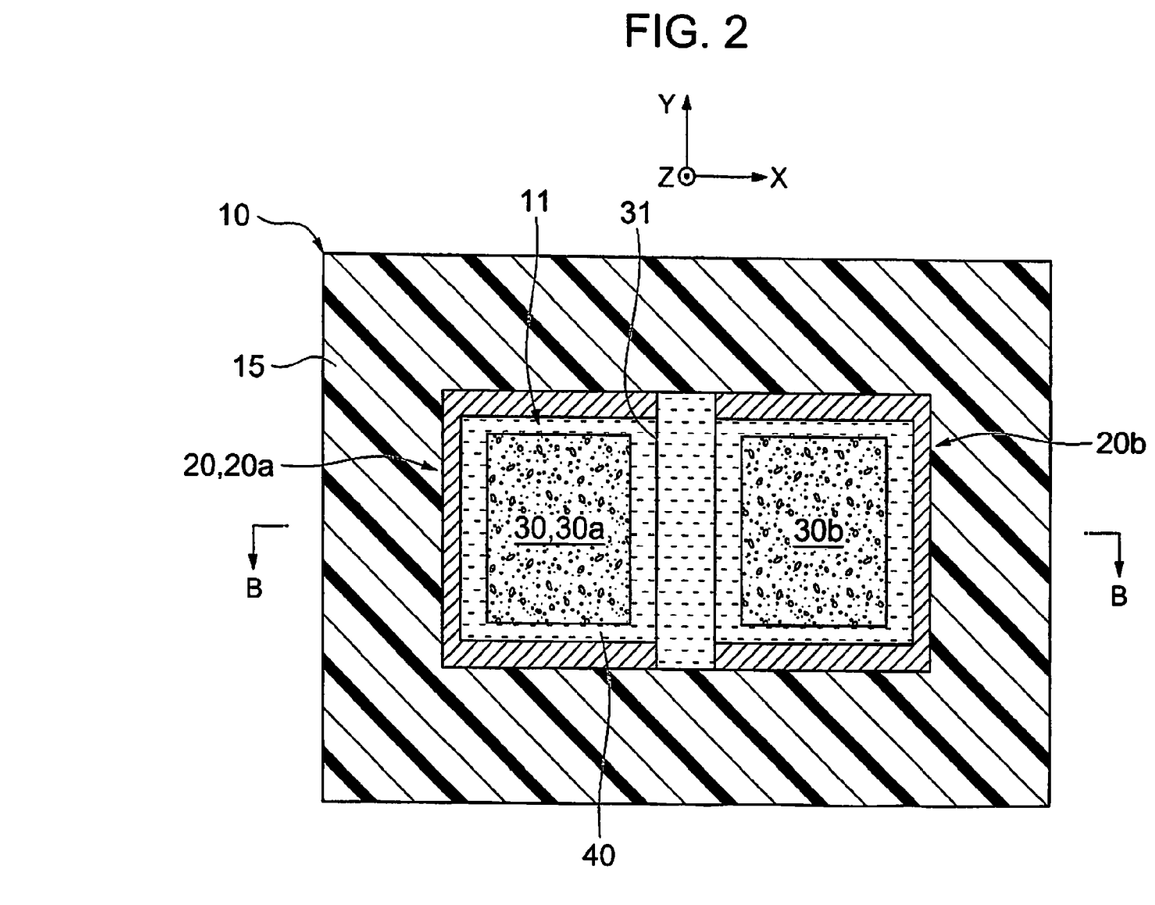
FIG. 2 shows an electric double layer capacitor according to the first embodiment and is a plan sectional view taken along the line A-A of FIG. 1.

FIGS. 1 and 2 are explanatory diagrams of an electric double layer capacitor according to a first embodiment. FIG. 1 is a side sectional view taken along the line B-B of FIG. 2, and FIG. 2 is a plan sectional view taken along the line A-A of FIG. 1. An electric double layer capacitor 1 according to the first embodiment includes a container 10 in which an opening of a concave portion 11 is sealed, a conductive film 20 (20a, 20b) which is formed from a bottom surface 13 of the concave potion 11 to an opening edge 19, an electrode active material 30 (30a, 30b), an electrolytic solution 40, and an impregnation material 34 which are enclosed inside the container 10, an opening sealing plate 42 which seals an opening of the container 10, and a sealing material 44 which is disposed on the outside of the opening sealing plate 42. Hereinafter, the arrangement direction of the pair of electrode active materials 30a and 30b is set to the X direction, the opening direction of the opening of the container 10 is set to the Z direction, and the direction perpendicular to the X and Z directions is set to the Y direction.

The container 10 is formed from a material such as ceramics, glass, or resin. As a ceramics material, HTCC (High Temperature Co-fired Ceramic) made from alumina, LTCC (Low Temperature Co-fired Ceramic) made from glass ceramics, or the like may be used. As a glass material, soda-lime glass, lead glass, or borosilicate glass may be used, but borosilicate glass is desirable in consideration of the workability. As a resin material, a thermoplastic resin is desirable, and PPS (polyphenylene sulfide), PEEK (polyether ether ketone), LCP (liquid crystal polymer), PTFE (polytetrafluoroethylene), PFA (tetrafluoroethylene-perfluoro alkyl vinyl ether copolymer), ETFE (tetrafluoroethylene-ethylene copolymer), or the like may be used.

The container 10 is formed in a rectangular parallelepiped box shape, and the concave portion 11 is formed by opening one surface of the container 10. The concave portion 11 is surrounded by a rectangular upper bottom wall 12 and a side wall 15 uprightly formed from the peripheral edge of the bottom surface 13 of the bottom wall 12. A protrusion 31 uprightly formed from the bottom surface 13 of the concave portion 11. As shown in FIG. 1, the protrusion 31 is disposed at the center portion in the X direction of the concave portion 11, and as shown in FIG. 2, the protrusion 31 is continuously formed throughout the entire width in the Y direction of the concave portion 11.

The conductive film 20 is formed from valve metal (metal forming a corrosion-resistant passive coating on its surface) or carbon (C) in order to prevent the conductive film 20 from being melted by the electrolytic solution 40 at a high potential. As a valve metal, aluminum (Al), titanium (Ti), tantalum (Ta), niobium (Nb), hafnium (Hf), zirconium (Zr), or the like may be exemplified, and particularly, aluminum (Al), titanium (Ti), or tantalum (Ta) is desirably adopted.

The conductive film 20 is desirably formed on an upper layer of a chrome layer as a foundation layer. By forming the foundation layer, it is possible to improve the adhesiveness of the conductive film 20 with respect to the container 10. In addition, as the foundation layer, a titanium layer is suitable as well as the chrome layer. The titanium layer may be used as the conductive film as well as the foundation layer.

As shown in FIG. 1, the conductive film 20 is continuously formed from the bottom surface 13 of the concave portion 11 to the opening edge 19 as the front end surface of the side wall 15 through the inner surface 16 of the side wall 15. In addition, the conductive film 20 formed on the bottom surface 13 of the concave portion 11 functions as a current collector 23, the conductive film 20 formed on the opening peripheral edge 19 functions as an external electrode 29, and the conductive film 20 formed on the inner surface 16 of the side wall 15 functions as a connection wiring between the current collector 23 and the external electrode 29.

Figure 3:
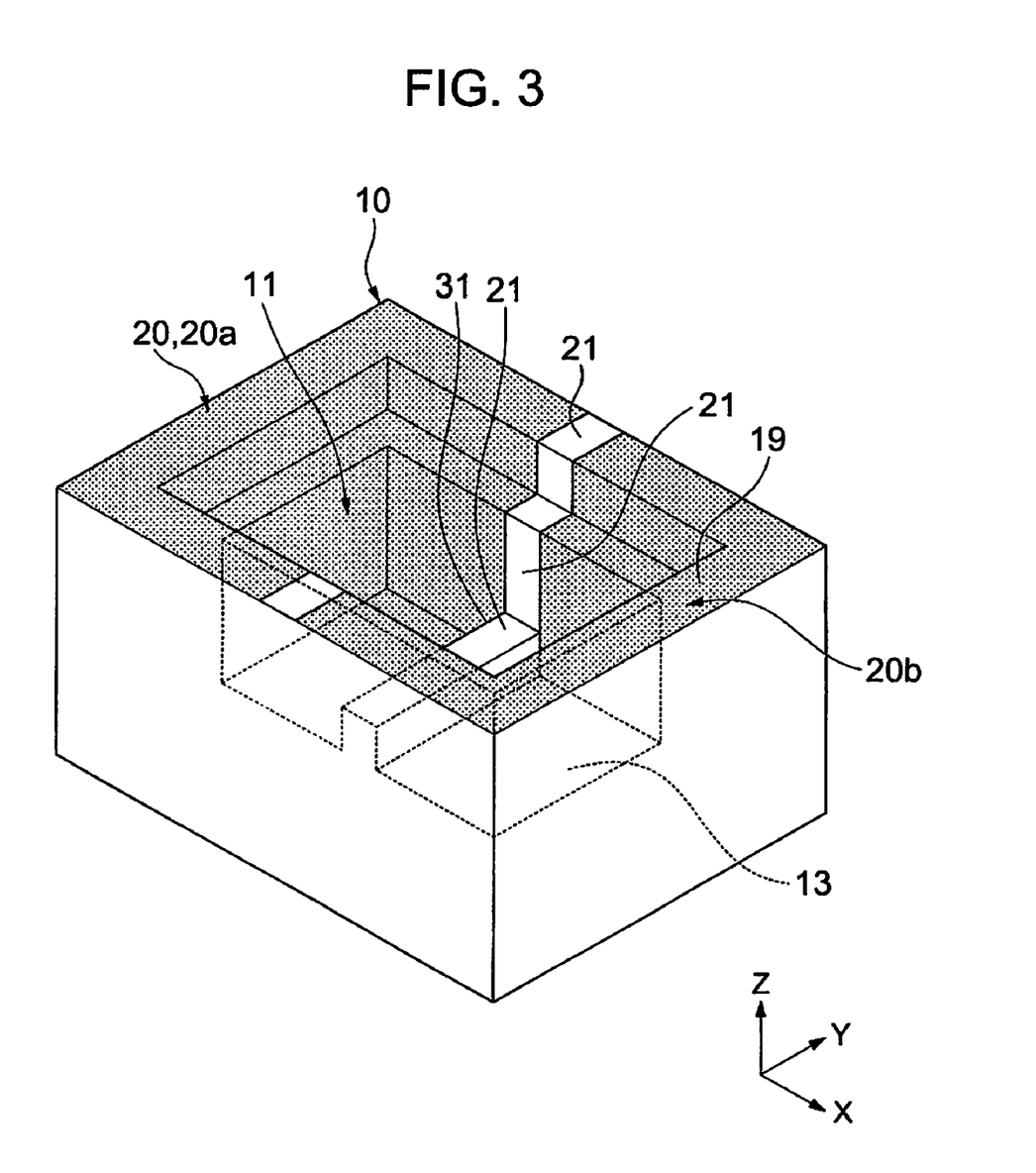
FIG. 3 is a perspective view of a container according to the first embodiment.

FIG. 3 is a perspective view of the container. A non-formation region 21 of the conductive film 20 is provided at the center portion in the X direction of the container 10. The non-formation region 21 is formed to have a width equal to that of the protrusion 31. The pair of conductive films 20a and 20b is disposed on both sides in the X direction with the non-formation region 21 interposed therebetween. The pair of conductive films 20a and 20b is electrically insulated from each other at the non-formation region 21 of the conductive film 20.

The electrode active material 30 may be constituted by the combination between activated coal using a phenol resin and activated coal using a coconut shell, or any one of them. As the activated coal, activated coal using resin carbide containing a fiber as a raw material may be used as well as natural constituents such as pitches or cokes. Upon manufacturing the activated coal, one or both of steam activation and alkali activation may be used.

The electrode active material 30 is formed in, for example, a rectangular parallelepiped shape, but may be formed in other shapes such as a cylindrical shape. As shown in FIG. 1, the electrode active material 30 is disposed on the surface of the current collector 23 through a conductive adhesive 33, and is electrically connected to the current collector 23.

In addition, the pair of electrode active materials 30a and 30b is disposed on both sides in the X direction with the protrusion 31 interposed therebetween. Since the pair of electrode active materials 30a and 30b is separated by the protrusion 31, it is possible to prevent short-circuit caused by a mixed touch between the pair of electrode active materials 30a and 30b. Here, it is desirable that the pair of electrode active materials 30a and 30b is disposed to be adjacent to each other by decreasing the width of the protrusion 31 as small as possible. Accordingly, it is possible to decrease an internal resistance of the electric double layer capacitor 1.

Further, a separator may be disposed between the pair of electrode active materials 30a and 30b. The separator may be formed from a heat-resistant resin such as PPS (polyphenylene sulfide), PEEK (polyether ether ketone), or PTFE or a nonwoven cloth formed from glass fibers. The separator may be disposed instead of the protrusion 31 or together with the protrusion 31. By disposing the separator, even when a vibration or drop shock is input to the capacitor, it is possible to prevent short-circuit caused by a mixed contact of the pair of electrode active materials 30a and 30b.

The electrolytic solution 40 is constituted by a solution in which carrier salt such as $(CH_3).(C_2H_5)_3NBF_4$ is melted a nonaqueous solvent such as propylene carbonate (PC). In addition, as the electrolytic solution 40, cyclic sulfone (sulfolane) or chain sulfone may be used. The electrolytic solution 40 is filled in the concave portion 11 of the container 10. In addition, since the electrode active material 30 has a porous structure, the electrolytic solution 40 is impregnated into the electrode active material 30.

The impregnation material 34 is formed in a sponge shape having elasticity and liquid absorbability by using glass fibers, resin wicks, or the like. The impregnation material 34 is formed in a rectangular parallelepiped shape, and is disposed so as to block the opening of the container 10. The impregnation material 34 is pressed toward the electrode active material 30, and is disposed in an elastically deformed state so as to cover the front end of the electrode active material 30. The electrolytic solution 40 is impregnated into the impregnation material 34. Accordingly, it is possible to maintain a state in which the electrolytic solution 40 is normally impregnated into the electrode active material 30.

The opening sealing plate 42 is formed from metallic aluminum or the like in order to ensure a sealing property of the container 10. Alumina is formed on the surface of the opening sealing plate 42 by a thermal oxidation treatment, so that the surface is allowed to have an electric insulation property. Accordingly, even when a mixed contact of the pair of electrode active materials 30a and 30b occurs with respect to the opening sealing plate 42 due to an input of a mechanical shock or an erroneous shape of the impregnation material 34, it is possible to prevent an occurrence of short-circuit. In addition, when there is no concern about short-circuit, it is not necessary to allow the surface of the opening sealing plate 42 to have an electric insulation property.

As shown in FIG. 1, the opening sealing plate 42 is disposed in a stepped portion 17 formed in the inner surface 16 of the side wall 15. The opening sealing plate 42 comes into contact with the pair of conductive films 20a and 20b, and short-circuit of the pair of conductive films 20a and 20b can be prevented by the alumina formed on the surface of the opening sealing plate 42. In addition, an adhesive is disposed between the stepped portion 17 and the opening sealing plate 42, so that a sealing property of the container 10 is ensured. As the adhesive, when an insulation adhesive is used, it is possible to prevent short-circuit of the pair of conductive films 20a and 20b even when alumina is not formed on the surface of the opening sealing plate 42. In addition, the sealing property of the container 10 may be ensured in such a manner that the opening sealing plate 42 and the container 10 are formed from the same kind of resin material, and both are heat-sealed to each other by heating and pressurizing.

As the sealing material 44, a one-liquid type or two-liquid type epoxy resin or various thermoplastic resins may be used. Particularly, when the container 10 is formed from a resin material, it is desirable to use the sealing material 44 having a thermal expansion coefficient equal to that of the resin material of the container 10. For this reason, as the resin material of the sealing material 44, it is desirable to use PPS, PEEK, LCP, PTFE, PFA, or ETFE.

The sealing material 44 is filled into the inside of the side wall 15 and the outside of the opening sealing plate 42. In addition, even when the above-described opening sealing plate 42 is just fixed, the sealing property of the container 10 has no problem in practical use, but when the sealing material 44 is provided to seal the container 10 together with the opening sealing plate 42, it is possible to improve the sealing property of the container 10. That is, even when the container 10 is used for a long time, it is possible to prevent the entry of moisture or the like from the bonding portion, and to prevent a leakage of a liquid from the container 10. Accordingly, it is possible to improve the long-term reliability of the electric double layer capacitor 1.

The electric double layer capacitor 1 according to the first embodiment is used while being mounted to a circuit board 9. Before the mounting operation of the electric double layer capacitor 1, a solder layer 50 is formed in advance on a surface of a connection terminal 90 of the circuit board 9. The external electrode 29 of the electric double layer capacitor 1 is disposed on the surface of the solder layer 50, and the solder layer 50 is melted by a reflow or the like so that the external electrode 29 is connected to the connection terminal 90. Accordingly, it is possible to mount the electric double layer capacitor 1 to the circuit board 9. In addition, it is desirable that a layer of nickel (Ni), tin (Sn), gold (Au), solder, or the like is provided in advance on the surface of the external electrode 29.

Method of Manufacturing Electric Double Layer Capacitor

Figure 4:
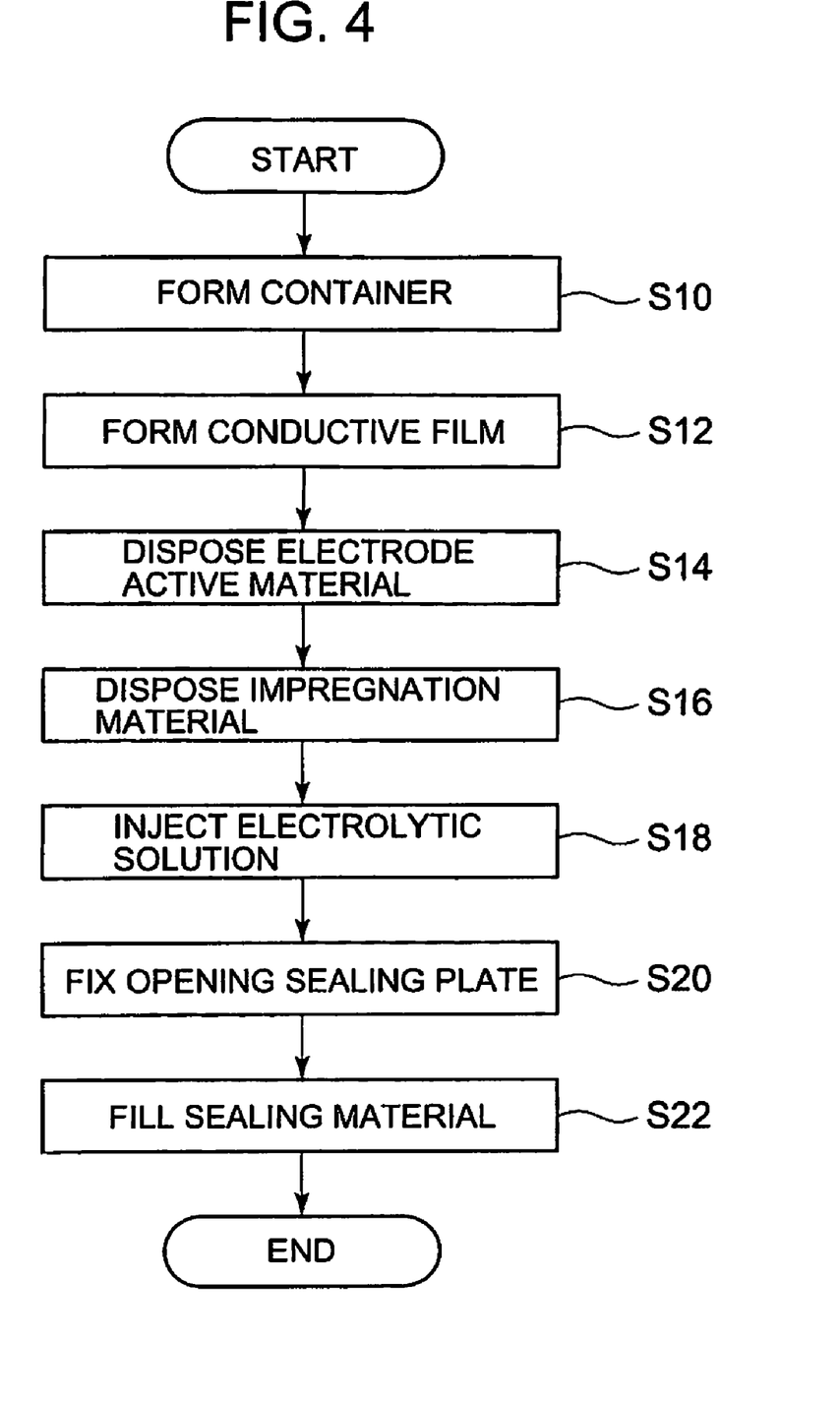
FIG. 4 is a flowchart of a method of manufacturing an electric double layer capacitor according to the first embodiment.

FIG. 4 is a flowchart of a method of manufacturing an electric double layer capacitor according to the first embodiment.

First, the container 10 is formed (S10). In the case where the container 10 is formed from ceramics, plural sheets of ceramics green sheets perforated in a predetermined shape are laminated in a predetermined shape, and are formed by burning. In the case where the container 10 is formed from glass, a glass wafer is heated to a predetermined temperature, and is formed by thermal forming while being pressed by a mold. In the case where the container 10 is formed from a resin, in addition to thermal forming after a resin is allowed to flow into the mold, as described below, a resin sheet is laminated and heat-sealed. In addition, in the case where the container 10 is formed by thermal forming, it is desirable that the container 10 is processed to have a predetermined thickness by performing lapping and polishing after thermal forming.

Figure 8:
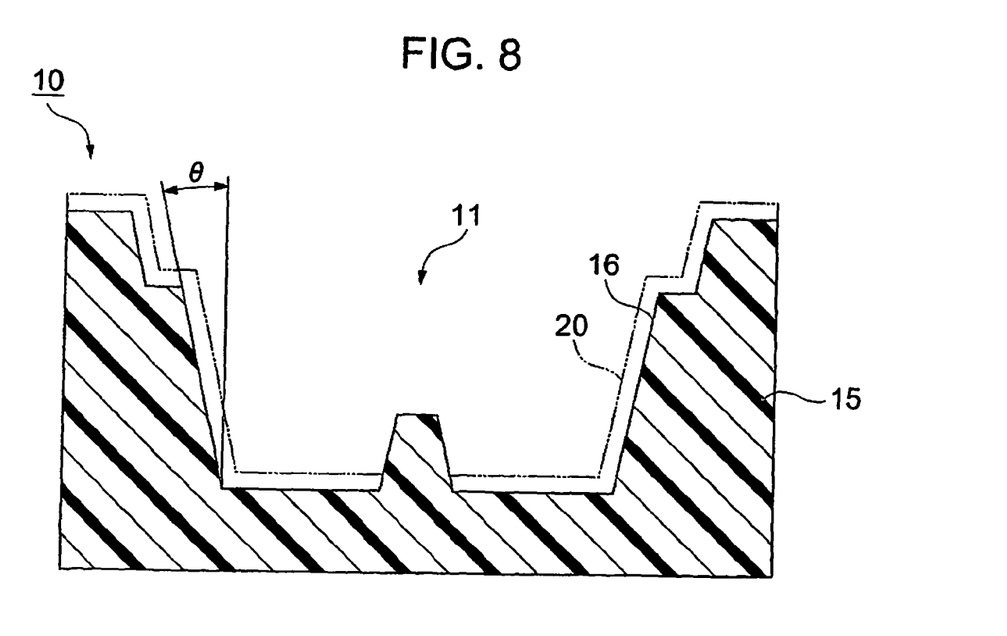
FIG. 8 is an explanatory diagram of the container having an extraction taper and is a side sectional view taken along the line B-B of FIG. 2.

FIG. 8 is an explanatory diagram of the container having an extraction taper, and is a side sectional view taken along the line B-B of FIG. 2. In the case where the container 10 is formed by thermal forming, it is desirable that the extraction taper is provided so as to facilitate a mold extraction operation, and the inner surface 16 of the side wall 15 is formed as an inclined surface so as to increase a diameter of the concave portion 11 from the bottom surface thereof to the opening. In this case, it is possible to easily form the conductive film 20 on the inner surface 16 of the side wall 15. An inclined angle θ of the extraction taper may be set to be equal to or more than 2° and equal to or less than 15°, and more desirably equal to or more than 5° and equal to or less than 7°.

Figure 9:
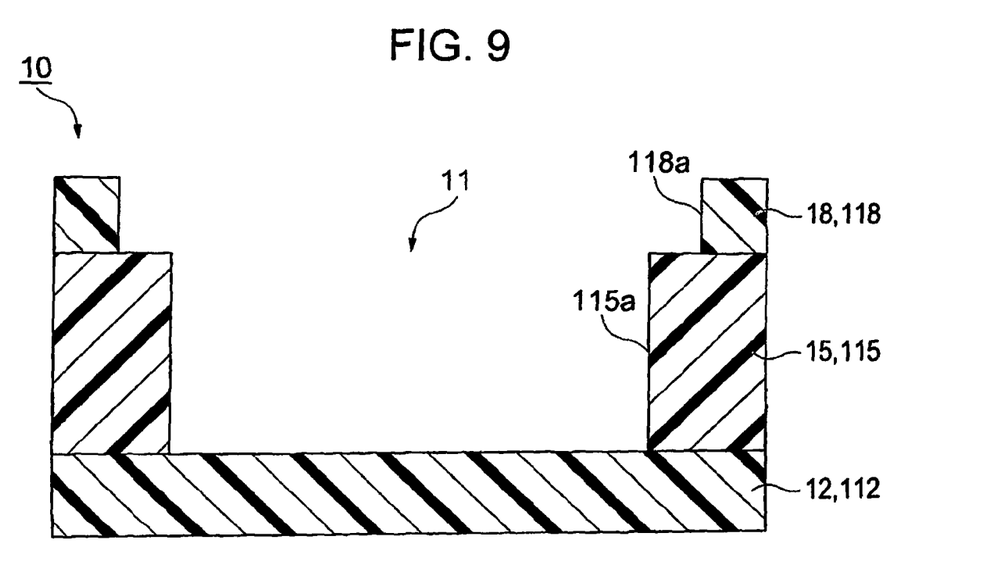
FIG. 9 is an explanatory diagram of the container formed by laminating a plurality of sheets and is a side sectional view taken along the line B-B of FIG. 2.

FIG. 9 is an explanatory diagram of a container formed by laminating a resin sheet, and is a side sectional view taken along the line B-B of FIG. 2. In the case where the container 10 is formed from a resin, as shown in FIG. 9, the container 10 may be formed in such a manner that resin sheets 112, 115, and 118 are laminated and heat-sealed. For example, the container 10 may be formed by laminating three types of sheets, that is, the first sheet 112 forming the bottom wall 12, the second sheet 115 forming the side wall 15, and the third sheet 118 forming the side wall 18. A second perforation hole 115a is formed in advance in the second sheet 115, and a third perforation hole 118a is formed in advance in the third sheet 118. By using the second perforation hole 115a and the third perforation hole 118a, it is possible to form the concave portion 11 of the container 10.

The laminated resin sheets 112, 115, and 118 are heat-sealed to each other by pressurizing and heating. In addition, in order to improve the adhesiveness between the sheets, a primary treatment is applied in advance on the surfaces of the sheets. The primary treatment is a treatment of allowing the surfaces of the sheets to be rough and activated, and one or both of a physical treatment (sand blasting or the like) and a chemical treatment (etching or the like) may be used. The pressurizing of each sheet is performed by applying, for example, a pressure equal to or more than $0.1$ $N/cm^2$ and equal to or less than $5.0$ $N/cm^2$ using a compressing press machine. The heating of each sheet is performed by allowing each resin sheet in which a microwave absorbing material is embedded in advance to be irradiated with a microwave. In addition, the heating of the resin may be performed by using a contact-type heating method such as an electric soldering gun or an ultrasonic welder in addition to a non-contact-type heating method such as a laser. By the heating, the temperature of each sheet is increased up to the vicinity of the melting point (about ±50° C. of the melting point). For example, in the case where the resin material of each sheet is PTFE (having a melting point of about 370° C.), the temperature of each sheet is increased up to about 320° C. Likewise, by the heating and pressurizing, it is possible to heat-fix plural resin sheets to each other. In addition, when the heat-sealed sheets are individualized to form the plural containers 10 by dicing, it is possible to simultaneously form the plural containers 10.

Subsequently, the conductive film 20 is formed (S12). It is desirable that the conductive film 20 is formed in accordance with physical vapor deposition such as depositing, thermal spraying, or sputtering in the state where the non-formation region 21 is masked by a metal mask, a resist mask, or the like. In addition, the conductive film 20 may be formed in accordance with a chemical film formation method such as plating.

Subsequently, the electrode active material 30 is disposed (S14). In the first embodiment, the pair of electrode active materials 30a and 30b is arranged on the bottom surface 13 of the concave portion 11. In detail, an appropriate amount of conductive adhesive 33 is applied on both sides of the protrusion 31 in the X direction in the bottom surface 13 of the concave portion 11, and the pair of electrode active materials 30a and 30b is respectively disposed on the surfaces. Subsequently, the container 10 is heated in a vacuum state so as to cure the conductive adhesive 33.

In the first embodiment, since the pair or electrode active materials 30a and 30b is arranged in the X direction, unlike the related art in which the pair or electrode active materials is laminated in the Z direction, it is possible to obtain a structure in which the pair of electrode active materials and the pair of conductive films are symmetrical to each other. That is, it is possible to form the pair of electrode active materials and the pair of conductive films from the same material, and to have a surface symmetrical shape having one YZ surface as a symmetry surface. Accordingly, it is possible to provide the electric double layer capacitor which can be used without distinguishing the positive electrode from the negative electrode.

Subsequently, the impregnation material 34 is disposed (S16). The impregnation material 34 is formed in advance in a predetermined shape, and is disposed so as to cover the pair of electrode active materials 30a and 30b in the state where the electrolytic solution is impregnated thereinto.

Subsequently, the electrolytic solution 40 is injected (S18). In detail, the electrolytic solution 40 drips into the concave portion 11 of the container 10 by using a dispenser or the like. Accordingly, the electrolytic solution 40 is impregnated into the electrode active material 30 having a porous structure. In addition, during the process in which the electrolytic solution 40 is impregnated, bubbles are discharged from the inside of the electrode active material 30.

In the first embodiment, the pair of electrode active materials 30a and 30b is arranged in the bottom surface 13 of the container 10. For this reason, it is possible to equally perfuse the electrolytic solution 40 to the pair of electrode active materials 30a and 30b. In addition, it is possible to equally discharge bubbles from the pair of electrode active materials 30a and 30b. Accordingly, since it is possible to impregnate the same amount of electrolytic solution 40 into the pair of electrode active materials 30a and 30b, it is possible to prevent a difference in electric characteristics caused by a difference in impregnation amount.

Subsequently, the opening sealing plate 42 is fixed (S20). In order to form the opening sealing plate 42, first, an aluminum flat plate is bent by pressing or etching, and a burr or the like is removed by barrel polishing. Subsequently, the surface is cleaned, and is subjected to a thermal oxidation treatment so as to allow the surface to have an insulation property. In order to fix the opening sealing plate 42, first, an adhesive is applied on the entire circumference of the stepped portion 17 of the container 10. Subsequently, the peripheral edge of the opening sealing plate 42 is placed on the stepped portion 17. Subsequently, the adhesive is cured so as to fix the opening sealing plate 42 to the container 10. Accordingly, the inside of the container 10 is hermetically sealed.

Subsequently, the sealing material 44 is filled (S22). In detail, first, a potting resin is applied on the outside of the opening sealing plate 42. Subsequently, the container 10 is heated so as to cure the sealing material 44. Since the sealing material 44 is strongly fixed to the surface of the opening sealing plate 42 and the side wall 15 of the container 10, it is possible to hermetically seal the inside of the container 10 in a reliable manner. Likewise, since it is possible to improve the sealing property of the container 10, it is desirable to perform Step S22. However, even when the opening sealing plate 42 is just fixed, since the sealing property of the container 10 has no problem in practical use, it is not essential to perform Step S22.

Finally, an electric characteristic is measured, and the process of manufacturing the electric double layer capacitor ends.

In addition, in the case where the container 10 is formed from glass, resin, or the like, the plural electric double layer capacitors 1 may be simultaneously formed by performing a batch treatment on a substrate of glass, resin, or the like. In this case, the substrate is cut at the last time so as to individually separate the electric double layer capacitors 1.

The cutting of the glass substrate may be performed by using a laser. At this time, a micro crack is generated in the surface of the glass substrate by setting a laser output, a repetition frequency, a scanning speed, and the like to predetermined values, respectively. Subsequently, the glass substrate is mechanically broken and individualized by a scribe device. By using such a method, it is possible to make a cutting margin to be zero, and to increase the number of containers 10 which can be disposed in the glass substrate. In addition, it is possible to shorten the process time required for the cutting.

Meanwhile, if an allowable cutting margin is set to about 0.1 mm, it is possible to perform the separating and individualizing by using a dicer. When the dicing is performed in two stages of a bevel cut and a full cut, it is possible to perform C-chamfering on the external shape outline of the container 10 by bevel cutting. Accordingly, there is an advantage in that it is possible to suppress the chipping of glass when the container 10 is gripped by tweezers.

As described above in detail, the electric double layer capacitor according to the first embodiment includes the container 10 in which the opening of the concave portion 11 is sealed, the electrolytic solution 40 and the pair of electrode active materials 30a and 30b accommodated inside the container 10, and the pair or conductive films 20a and 20b which are respectively and electrically connected to the pair or electrode active materials 30a and 30b and are formed from the bottom surface 13 of the concave portion 11 to the surface of the container 10 through the opening edge.

With such a configuration, the conductive film 20 formed on the bottom surface 13 of the concave portion 11 functions as the current collector 23, and the conductive film 20 formed on the opening edge 19 of the concave portion 11 functions as the external electrode 29. For this reason, since the conductive film 20 is formed from the bottom surface 13 of the concave portion 11 to the opening edge 19, it is possible to simultaneously form the current collector 23, the external electrode 29, and the connection wiring therebetween. Accordingly, it is possible to simply connect the current collector 23 to the external electrode 29. At this time, since a lead frame, a via, or the like is not used, it is possible to ensure the sealing property of the container 10.

In addition, since the conductive film 20 is formed from the bottom surface 13 of the concave portion 11 to the opening edge 19, it is possible to simply form the conductive film 20 in such a manner that the film formation process is performed from the side of the opening by masking the non-formation region 21 of the conductive film 20. In addition, since the conductive film 20 is formed on the surface of the container 10, it is possible to form the conductive film 20 after forming the container 10. For this reason, since it is not necessary to form the conductive film 20 by using a material capable of enduring a burning temperature of the container 10, it is possible to decrease the manufacturing cost. Accordingly, it is possible to simply connect the current collector to the external electrode at a low cost.

For example, in the related art in which the lead frame is adopted for the resinous container, it is necessary to perform a bending process on the external electrode. However, in the first embodiment, since it is not necessary to perform the bending process on the external terminal, it is possible to decrease the manufacturing cost. In addition, in the related art, since a stress acts on the container from the external terminal when the bending process is performed on the external terminal, there is a concern that the sealing property of the container is degraded. On the contrary, in the first embodiment, since it is not necessary to perform the bending process on the external terminal, it is possible to ensure the sealing property of the container.

In addition, in the related art in which the ceramics container is adopted, it is necessary to form the current collector or the like capable of enduring a sintering temperature of the container. However, in the first embodiment, since it is not necessary to form the current collector or the like by using such a metal material, it is possible to decrease the manufacturing cost. In addition, in the related art in which the glass container is adopted, it is necessary to form a via. However, in the first embodiment, since it is not necessary to form the via, it is possible to remarkably decrease the manufacturing cost and to ensure the sealing property of the container 10.

In addition, in the electric double layer capacitor according to the related art, in many cases, the external electrode is formed on the outer surface of the bottom wall 12 of the container 10. On the contrary, in the first embodiment, the external electrode 29 is formed on the opening edge 19 of the container 10. Even in this case, it is possible to mount the electric double layer capacitor in the state where the opening sealing plate 42 faces the circuit board 9. In addition, in the first embodiment, since the conductive film 20 is continuously formed from the bottom surface 13 of the concave portion 11 to the opening edge 19 by performing the film formation process from the opening of the concave portion 11, it is possible to simultaneously and easily form the current collector 23, the external electrode 29, and the connection wiring therebetween. Accordingly, since the manufacturing process is simplified, it is possible to decrease the manufacturing cost.

Second Embodiment

Figure 5:
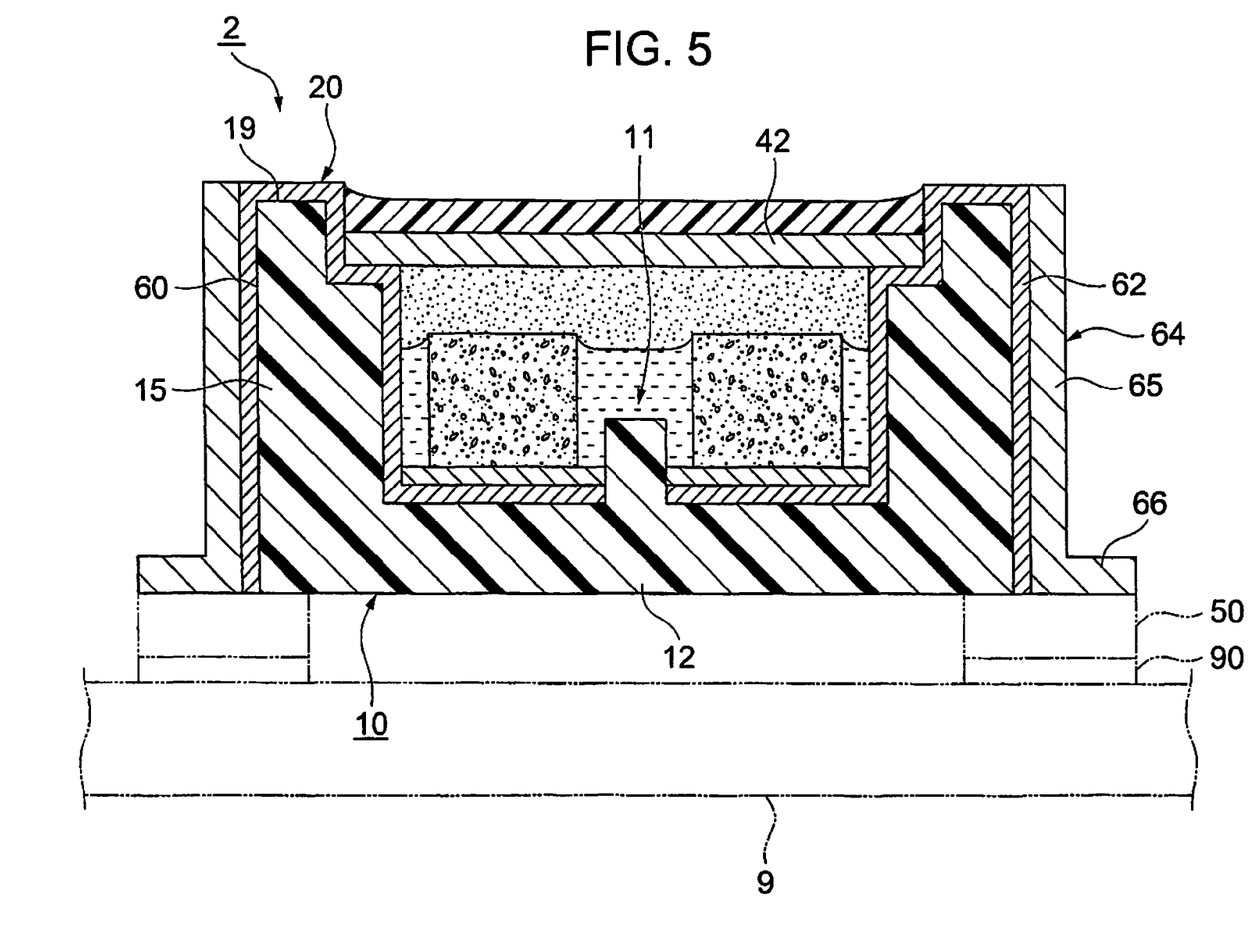
FIG. 5 shows an electric double layer capacitor according to a second embodiment and is a side sectional view taken along the line B-B of FIG. 2.

FIG. 5 is an explanatory diagram of the electric double layer capacitor according to a second embodiment, and is a side sectional view taken along the line B-B of FIG. 2. As shown in FIG. 5, an electric double layer capacitor 2 according to the second embodiment is different from that of the first embodiment in that the conductive film 20 is continuously formed on an outer surface 60 of the side wall 15 and a side surface electrode 62 is formed. In addition, regarding the portion having the same configuration as that of the first embodiment, the detailed description thereof will be omitted.

Figure 6:
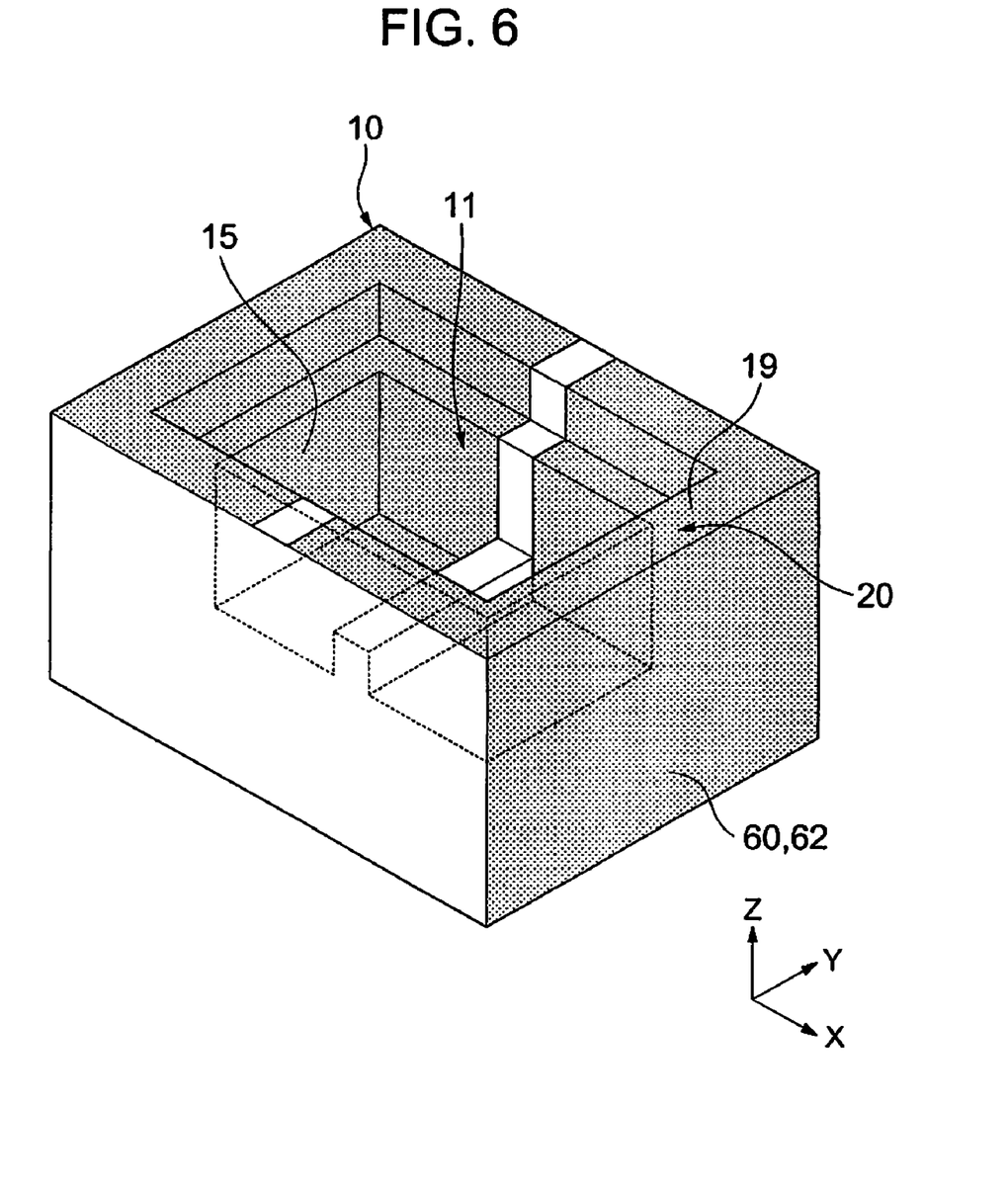
FIG. 6 is a perspective view of a container according to the second embodiment.

FIG. 6 is a perspective view of the container according to the second embodiment. The conductive film 20 is continuously formed from the opening edge 19 of the concave portion 11 of the container 10 to the outer surface 60 in the X direction of the side wall 15. Accordingly, the conductive film 20 may be continuously formed to the outer surface 60 in the Y direction of the side wall 15. The conductive film 20 formed on the outer surface 60 functions as the side surface electrode 62.

As shown in FIG. 5, an L-shaped member 64 is attached to the surface of the side surface electrode 62. The L-shaped member 64 is formed from a conductive material, is fixed to the side surface electrode 62 by a conductive adhesive, and is electrically connected to the side surface electrode 62. The L-shaped member 64 includes a base portion 65 which follows the side surface electrode 62 and a bottom portion 66 which extends in the normal direction of the side surface electrode 62 from the front end of the base portion 65 on the side of the bottom wall 12 of the container 10.

The electric double layer capacitor according to the first embodiment has a configuration in which the opening sealing plate 42 of the container 10 is mounted toward the circuit board 9, but the electric double layer capacitor according to the second embodiment has a configuration in which the bottom wall 12 of the container 10 is mounted toward the circuit board 9. In detail, the solder layer 50 is formed on the surface of the connection terminal 90 of the circuit board 9, the bottom portion 66 of the L-shaped member 64 is disposed on the surface of the solder layer 50, and the solder layer 50 is melted by a reflow or the like so as to connect the bottom portion 66 to the connection terminal 90.

Even in the second embodiment, it is possible to exhibit the same advantage as that of the first embodiment. Particularly, in the second embodiment, since the conductive film 20 is continuously formed to the outer surface 16 of the side wall 15 of the container 10, even when the resinous container 10 is adopted, it is possible to suppress that moisture passes through the resin and enters into the container 10.

Figure 7:
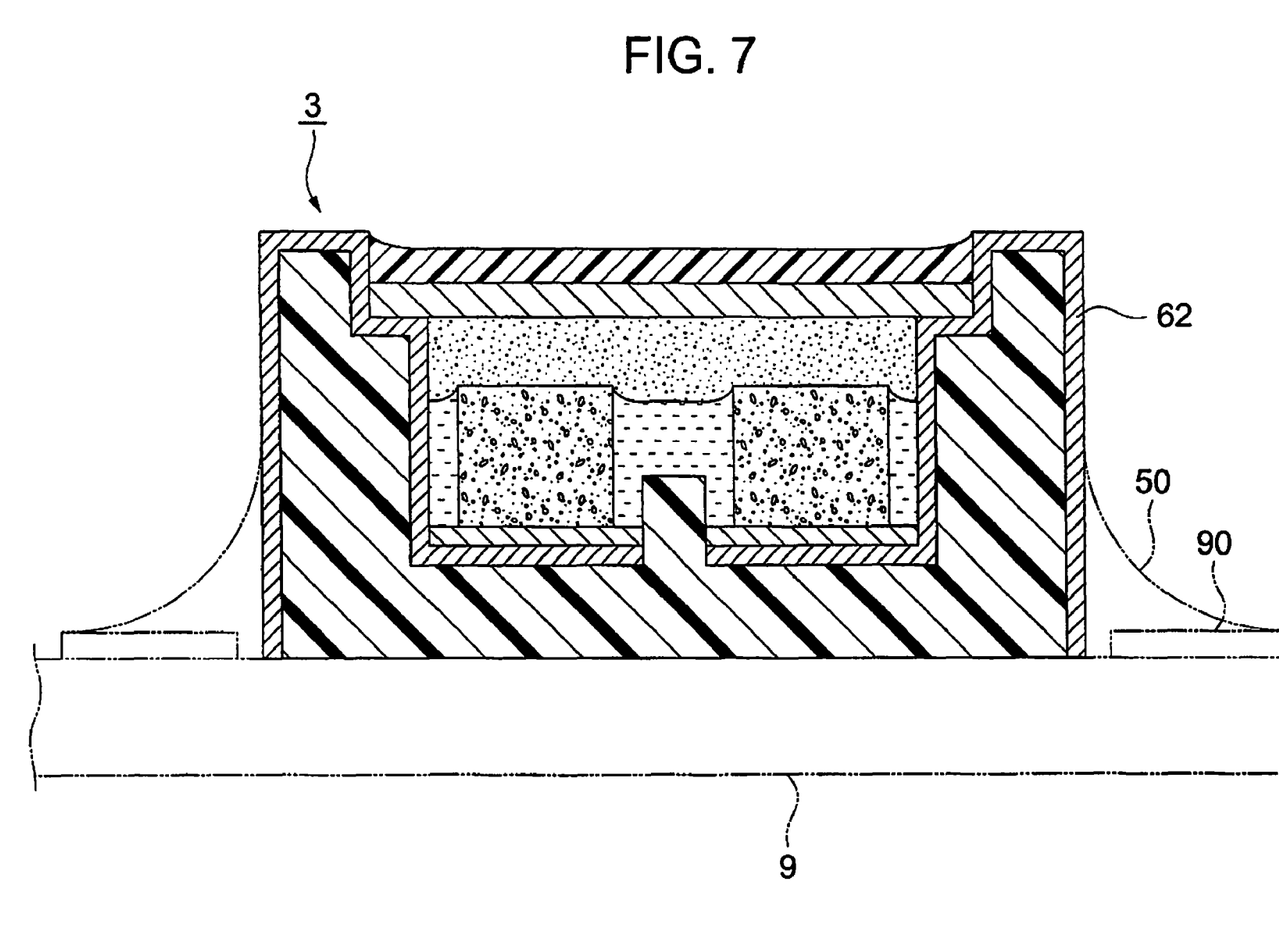
FIG. 7 shows the electric double layer capacitor according to a modified example of the second embodiment and is a side sectional view taken along the line B-B of FIG. 2.

FIG. 7 is an explanatory diagram of the electric double layer capacitor according to a modified example of the second embodiment, and a side sectional view taken along the line B-B of FIG. 2. In an electric double layer capacitor 3 according to the modified example shown in FIG. 7, the side surface electrode 62 is exposed to the outside. By disposing a solder 50 at the corner between the side surface electrode 62 and the connection terminal 90 of the circuit board 9, it is possible to mount the electric double layer capacitor 3 to the circuit board 9. In this case, since it is not necessary to provide the L-shaped member, it is possible to decrease the manufacturing cost.

In addition, the technical scope of the invention is not limited to the above-described embodiments, but various modifications of the above-described embodiments may be made within the scope not departing from the spirit of the invention. That is, the detailed materials or layer structures described in the embodiments are merely examples, but may be appropriately modified.

As shown in FIG. 1, the conductive film 20 may be formed from the bottom surface 13 of the concave portion 11 to the opening edge 19, and the detailed shape thereof may be arbitrarily set. As shown in FIG. 3, the conductive film 20 according to the first embodiment is continuously formed from the bottom surface 13 of the concave portion 11 to the opening edge in the Y direction in addition to the opening edge 19 in the X direction, but may be continuously formed to the opening edge in any one direction. In addition, the conductive film 20 may not be formed on the entire surface of the opening edge 19 and the bottom surface 13 of the concave portion 11, but may be formed only on a part of them.

In addition, the shape of the container 10 is not limited to the rectangular parallelepiped shape, but may be formed in other shapes. However, when the container 10 is formed in a rectangular parallelepiped shape as in the other electronic components mounted to the circuit board, it is possible to make a dead space small in the case where the electric double layer capacitor is mounted to the circuit board.

Further, the material of the constituent of the electric double layer capacitor is not limited to the material in the embodiments, but various materials may be adopted.

For example, as the electrolytic solution 40, cyclic esters, chain esters, cyclic ethers, chain ethers, and the like are appropriately used. In detail, a nonaqueous solvent such as propylene carbonate (PC), ethylene carbonate (EC), butylene carbonate (BC), vinyl carbonate, dimethyl carbonate (DMC), diethyl carbonate (DEC), γ-butyrolactone (γBL), 2 methyl-γ-butyrolactone, acetyl-γ-butyrolactone, γ-valerolactone, 1,2-dimethoxyethane (DME), 1,2-ethoxyethane, diethyl ether, ethylene glycol dialkyl ether, diethylene glycol dialkyl ether, triethylene glycol dialkyl ether, tetraethylene glycol dialkyl ether, dipropyl carbonate, methyl ethyl carbonate, methyl butyl carbonate, methyl propyl carbonate, ethyl butyl carbonate, ethyl propyl carbonate, butyl propyl carbonate, propionic acid alkyl ether, malonic acid dialkyl ether, acetic acid alkyl ether, tetrahydrofurane (THF), alkyltetrahydrofurane, dialkylalkyltetrahydrofurane, alkoxytetrahydrofurane, dialkoxytetrahydrofurane, 1,3-dioxalne, alkyl-1,3-dioxolane, 1,4-dioxolane, 2-methyltetrahydrofurane, dimethylsulfoxide, 1,3-dioxolane, formamide, dimethylformamide, dioxolane, acetonitrile, nitromethane, methyl formate, methyl acetate, methyl propionate, ethyl propanoate, phosphate triester, maleic acid anhydride, sulfolane, or 3-methylsulfolane, derivatives thereof, or mixtures thereof is desirably used.

EXAMPLE 1

The electric double layer capacitor 1 shown in FIG. 1 was manufactured to be mounted on the circuit board 9, and was evaluated.

The container 10 was formed from alumina so as to have a size of 3.2 by 2.5 by 1 mm. The depth of the concave portion 11 was set to 0.6 mm, and the size thereof was set to 2 by 1.5 mm. By a vacuum deposition of Al, the pair of conductive films 20a and 20b was formed from the bottom surface 13 of the concave portion 11 to the opening edge 19. In addition, the connection terminal 50 was manufactured by solder plating.

The electrode active materials 30a and 30b were manufactured as below. First, 65% of carbon black as a conductive material was mixed with 45% of commercially available activated coal (specific surface area of 2260 m$^2$/g), and was kneaded at 100° C. by using a kneading machine (twin screw kneader). Subsequently, the kneaded product was pressed by a roll press so as to have a sheet shape having a thickness of 0.22 mm. After the sheet was dried, a cutting was performed to have a cubic shape in which one side is 0.22 mm, and the electrode active materials 30a and 30b were obtained. In addition, as the electrolytic solution 40, a solution obtained by melting 1 mol/L of $(CH_3).(C_2H_5)_3NBF_4$ in a nonaqueous solvent constituted by propylene carbonate (PC) was used.

Subsequently, the electrode active materials 30a and 30b and the impregnation material 34 were inserted into the concave portion 11 of the container 10. The impregnation material 34 was formed to have a thickness of 25 μm and a size of 1.8 by 1.3 mm. In addition, the opening sealing plate 42 and the sealing material 44 were placed and heated on the concave portion 11 so as to seal the opening thereof.

Subsequently, cream solder was passed on the position of the connection terminal on the substrate so as to perform reflow soldering on the electric double layer capacitor. In detail, pre-heating was performed under the condition of 180° C.×10 minutes, and main heating was performed under the condition of 240° C.×1 minute.

As a result, bursting or the like was not generated in the electric double layer capacitor 1.

According to the electrochemical cell of the invention, since the conductive films 20a and 20b are formed from the bottom surface 13 of the concave portion 11 to the opening edge, it is possible to simply connect the current collector 23 to the external electrode 29 at a low cost. At this time, since a lead frame, a via, or the like is not used, it is possible to ensure the sealing property of the container 10.

What is claimed is:

1. An electrochemical cell comprising:
   a container in which an opening of a concave portion is disposed opposite a bottom surface of the concave portion and is sealed;
   an electrolytic solution and a pair of electrode active materials which are accommodated inside the container; and
   a pair of conductive films which is respectively and electrically connected to the pair of electrode active materials and is formed from the bottom surface of the concave portion toward the opening of the container through an opening edge.

2. The electrochemical cell according to claim 1, wherein the pair of electrode active materials is disposed in parallel in a bottom surface of the concave portion.

3. The electrochemical cell according to claim 2, wherein the pair of conductive films is formed from valve metal.

4. The electrochemical cell according to claim 3, wherein the pair of conductive films are continuously formed from the bottom surface of the concave portion to a side surface of the container through the opening edge.

5. The electrochemical cell according to claim 3, wherein the container is formed by laminating and heat-sealing a plurality of resin sheets.

6. The electrochemical cell according to claim 2, wherein the pair of conductive films are continuously formed from the bottom surface of the concave portion to a side surface of the container through the opening edge.

7. The electrochemical cell according to claim 2, wherein the container is formed by laminating and heat-sealing a plurality of resin sheets.

8. The electrochemical cell according to claim 1, wherein the pair of conductive films are continuously formed from the bottom surface of the concave portion to a side surface of the container through the opening edge.

9. The electrochemical cell according to claim 8, wherein the container is formed by laminating and heat-sealing a plurality of resin sheets.

10. The electrochemical cell according to claim 1, wherein the container is formed by laminating and heat-sealing a plurality of resin sheets.

* * * * *